United States Patent [19]
LaCroix et al.

[11] Patent Number: 4,906,015
[45] Date of Patent: Mar. 6, 1990

[54] VEHICLE MOUNTED UTILITY RACK

[76] Inventors: Colan L. LaCroix, 16 Chellis St., Claremont, N.H. 03743; Alan E. Tewksbury, R.F.D. 2, Cornish, N.H. 03745

[21] Appl. No.: 268,876
[22] Filed: Nov. 8, 1988
[51] Int. Cl.⁴ .................................................. B60R 9/00
[52] U.S. Cl. .............................. 280/415.1; 224/42.07; 280/491.2; 280/769
[58] Field of Search ...................... 280/762, 769, 415.1, 280/504, 491.1, 491.2, 491.5; 224/42.07, 42.08

[56] References Cited

U.S. PATENT DOCUMENTS

| | | | |
|---|---|---|---|
| 4,191,388 | 3/1980 | Barksdale | 280/166 |
| 4,194,754 | 3/1980 | Hightower | 280/166 |
| 4,203,611 | 5/1980 | Makela | 280/163 |
| 4,234,284 | 11/1980 | Hauff | 224/42.08 |
| 4,274,648 | 6/1981 | Robins | 280/166 |
| 4,394,947 | 7/1983 | Tartaglia | 224/42.07 |
| 4,405,141 | 9/1983 | Jurek | 280/163 |
| 4,744,590 | 5/1988 | Chesney | 280/769 |
| 4,813,584 | 3/1989 | Wiley | 224/42.07 |

Primary Examiner—David M. Mitchell
Attorney, Agent, or Firm—Jerry T. Kearns

[57] ABSTRACT

A utility rack is designed for attachment to class II type trailer hitches mounted adjacent the rear bumper of a vehicle. The utility rack is designed to provide additional storage and transportation space to modern down-sized vehicles. The utility rack has a mounting bar which terminates in a straight portion having a free end dimensioned for insertion into a class II type trailer hitch. The mounting bar has an upwardly inclined portion having an end which terminates at an elevation substantially above the trailer hitch. An upwardly opening V-shaped transverse support strut and a vertical support column are connected to the mounting bar and support a rectangular platform having a horizontal steel mesh surface. A pair of tail lights are mounted in steel reinforced guards on a rear edge of the platform. A conventional wire harness is utilized to connect the tail lights to the vehicle electrical system. The utility rack may be utilized for transporting game animals and a wide variety of other items.

1 Claim, 3 Drawing Sheets

VEHICLE MOUNTED UTILITY RACK

BACKGROUND OF THE INVENTION

1. Field of the Invention

The present inVention relates to utility racks, and more particularly pertains to a vehicle mounted utility rack designed to provide needed additional storage and transportation space on modern down-sized vehicles. The need for increasingly fuel efficient vehicles has resulted in increasingly smaller recreational and four wheel drive vehicles. As individuals purchasing these vehicles frequently participate in hunting, camping and other outdoor activities, there is a need to provide convenient storage for equipment utilized in these activities. In order to overcome this problem, the present invention provides a quickly removable utility rack adapted for connection with a class II trailer hitch on a vehicle.

2. Description of the Prior Art

Various types of vehicle attached devices are known in the prior art. A typical example of such a device is to be found in U.S. Pat. No. 4,191,388, which issued to L. Barksdale on Mar. 4, 1980. This patent discloses a step for attachment to a tail gate of a truck to facilitate entry into the truck bed. U.S. Pat. No. 4,194,754, which issued to R. Hightower on Mar. 25, 1980, discloses an auxiliary foldable step for pick up trucks which can be secured to the bumper of the truck with the weight of the step supported thereby and folded up when closed against the tail gate of the truck. U.S. Pat. No. 4,203,611, which issued to M. Makela on May 20, 1980, discloses a running board attachment for light trucks which is formed from extruded aluminum and attached to transverse frame arms secured to the frame of the truck. U.S. Pat. No. 4,274,648, which issued to R. Robins on June 23, 1981, discloses a vehicle bumper step formed by an upwardly open frame having clamp members secured to its upper surface for mounting the frame on a vehicle bumper by gripping a bumper flange. U.S. Pat. No. 4,405,141, which issued to L. Jurek on Sep. 20, 1983, discloses a pair of separate stackable steps for attachment to a vehicle bumper for use by an individual while servicing the vehicle.

While the above mentioned devices are suited for their intended usage, none of these devices disclose a utility rack adapted for attachment to a class II type trailer hitch of a vehicle. Additionally, none of the aforesaid devices disclose the use of a mounting bar having straight and inclined portions in conjunction with a V-shaped transverse support strut and a vertical support column for supporting a rectangular steel mesh platform substantially above the elevation of the vehicle trailer hitch. Inasmuch as the art is relatively crowded with respect to these various types of utility racks, it can be appreciated that there is a continuing need for and interest in improvements to such utility racks, and in this respect, the present invention addresses this need and interest.

SUMMARY OF THE INVENTION

In view of the foregoing disadvantages inherent in the known types of utility racks now present in the prior art, the present invention provides an improved vehicle mounted utility rack. As such, the general purpose of the present invention, which will be described subsequently in greater detail, is to provide a new and improved vehicle mounted utility rack which has all the advantages of the prior art utility racks and none of the disadvantages.

To attain this, a representative embodiment of the concepts of the present invention is illustrated in the drawings and makes use of a utility rack designed for attachment to class II type trailer hitches mounted adjacent the rear bumper of a vehicle. The utility rack is designed to provide additional storage and transportation space to modern down-sized vehicles. The utility rack has a mounting bar which terminates in a straight portion having a free end dimensioned for insertion into a class II type trailer hitch. The mounting bar has an upwardly inclined portion having an end which terminates at an elevation substantially above the trailer hitch. An upwardly opening V-shaped transverse support strut and a vertical support column are connected to the mounting bar and support a rectangular platform having a horizontal steel mesh surface. A pair of tail lights are mounted in steel reinforced guards on a rear edge of the platform. A conventional wire harness is utilized to connect the tail lights to the vehicle electrical system. The utility rack may be utilized for transporting game animals and a wide variety of other items.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle mounted utility rack which has all the advantages of the prior art utility racks and none of the disadvantages.

It is another object of the present invention to provide a new and improved vehicle mounted utility rack which may be easily and efficiently manufactured and marketed.

It is a further object of the present invention to provide a new and improved vehicle mounted utility rack which is of a durable and reliable construction.

An even further object of the present invention is to provide a new and improved vehicle mounted utility rack which is susceptible of a low cost of manufacture with regard to both materials and labor, and which accordingly is then susceptible of low prices of sale to the consuming public, thereby making such utility racks economically available to the buying public.

Still yet another object of the present invention is to provide a new and improved vehicle mounted utility rack which provides in the apparatuses and methods of the prior art some of the advantages thereof, while simultaneously overcoming some of the disadvantages normally associated therewith.

Still another object of the present invention is to provide a new and improved vehicle mounted utility rack for providing additional space for the storage and transportation of various items on modern down-sized vehicles.

Yet another object of the present invention is to provide a new and improved vehicle mounted utility rack which may be quickly attached and removed from vehicles provided with class II type trailer hitches.

Even still another object of the present invention is to provide a new and improved vehicle mounted utility rack for enabling game animals and various other items to be transported exteriorly of a vehicle to protect the vehicle interior against damage and to provide additional room for vehicle occupants.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
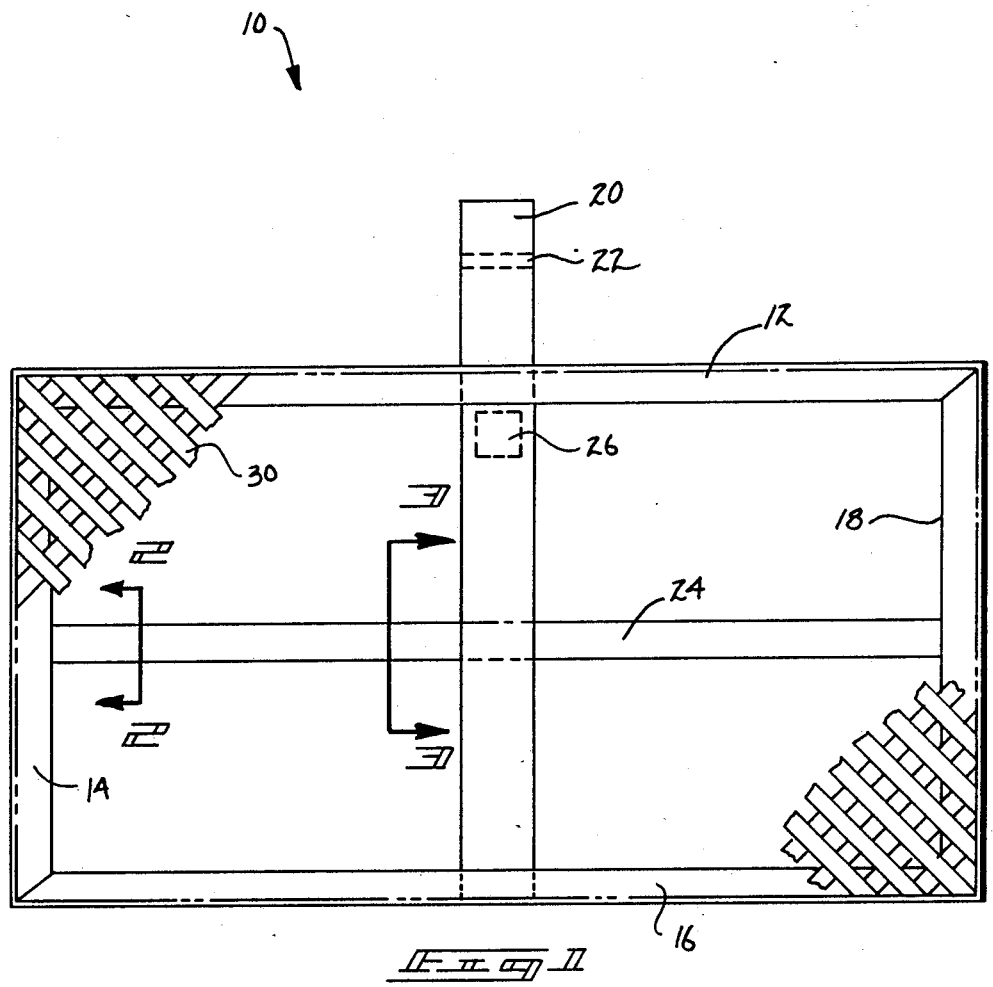
FIG. 1 is a top view of the vehicle mounted utility rack of the present invention.

With reference now to the drawings and in particular to FIG. 1 thereof, a new and improved vehicle mounted utility rack embodying the principles and concepts of the present invention and generally designated by the reference numeral 10 will be described.

More specifically, it will be noted that the first embodiment 10 of the invention includes a horizontal platform formed by front and back side rails 12 and 16, respectively, which are joined by side rails 14 and 18. The horizontal platform is provided with a horizontal surface formed by a steel meshed covering 30, which has been cut away for purposes of illustrating the platform support frame. The various elements are preferably formed from steel or high strength aluminum and are preferably connected by welding. A mounting bar 20 is preferably formed from steel tubing and has a square transverse cross sectional shape terminating in a free end dimensioned for insertion into a class II type REESE trailer hitch. A transverse aperture 22 is provided adjacent the free end for reception of a conventional trailer hitch retaining pin. An upwardly opening V-shaped transverse support strut 24 has an apex connected to an upwardly inclined portion of the mounting bar 20, as may be best understood with reference to FIG. 4.

Figure 2:
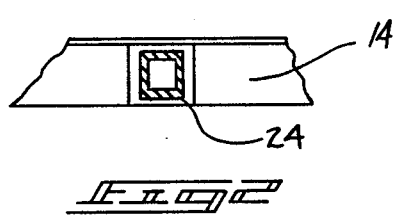
FIG. 2 is a partial cross sectional view, taken along line 2—2 of FIG. 1.

As shown in FIG. 2, the free ends of the V-shaped strut 24 are connected to the side rails of the horizontal support platform.

Figure 3:
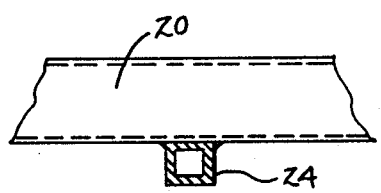
FIG. 3 is a partial cross sectional view, taken along line 3—3 of FIG. 1.

As shown in the partial cross sectional view of FIG. 3, the support strut 24 is connected by welding to the mounting bar 20.

Figure 4:
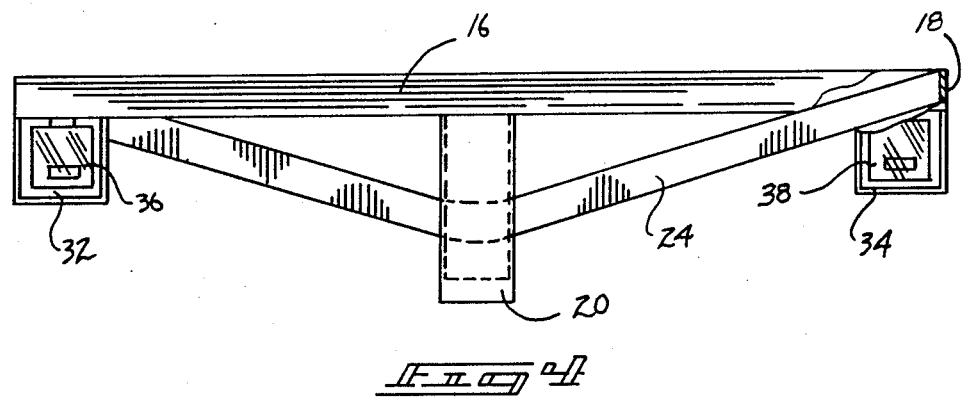
FIG. 4 is a rear view, partially cut away, of the utility rack of the present invention.

FIG. 4 provides a rear view of the utility rack. The rear side rail 16 has been partially cut away to illustrate attachment of the right side upper free end of the V-shaped support strut 24 to the right frame platform side rail 18. A pair of steel reinforced tail light guards or enclosures 32 and 34 are provided adjacent the rear edge of the platform and are secured to the rail 16. The guards 32 and 34 enclose conventional tail lights 36 and 38 which are wired by a conventional harness to a quick release connector for connection in a conventional fashion with the electrical system of the vehicle.

Figure 5:
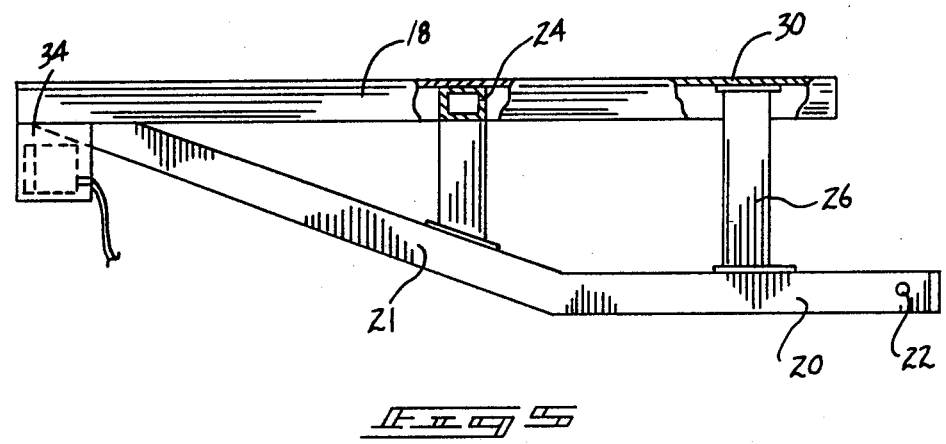
FIG. 5 is a side view, partially cut away, of the utility rack of the present invention.

As shown in the side view of FIG. 5, the mounting bar 20 has an upwardly inclined portion 21 which terminates at an elevation substantially above the free end of the straight portion of the mounting bar 20, adjacent the transverse aperture 22. A vertical support column 26 is connected to the straight portion of the mounting bar 20, and terminates at an elevation equal with the free ends of the support strut 24 and the upper end of the inclined mounting bar portion 21. This provides support for the horizontal platform at a level substantially above the trailer hitch of a vehicle.

Figure 6:
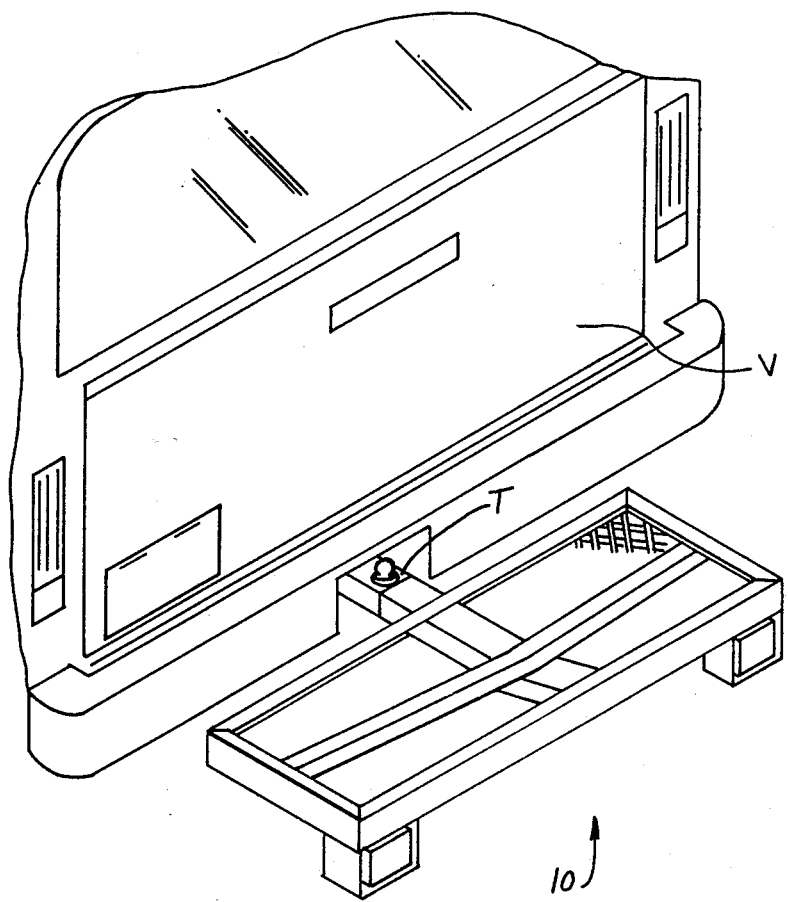
FIG. 6 is a partial perspective view, illustrating the attachment of the utility rack of the present invention on a vehicle.

FIG. 6 provides a partial perspective view which illustrates the attachment of the utility rack 10 of the present invention to a vehicle utilizing a conventional class II trailer hitch. The utility rack of the present invention may be installed in less than two minutes by merely inserting the free end of the mounting bar into the trailer hitch tongue and installing a conventional retaining pin. The wiring harness of the utility rack may be connected to the vehicle electrical system using conventional quick release connectors. The utility rack may be utilized for carrying game animals, wood, camping equipment, fish, coolers, and a wide variety of other items. The utility rack can support up to three hundred and fifty pounds without exceeding the safety tongue weight rating of a conventional class II trailer hitch. Additionally, because of the novel platform support structure, the utility rack may be unevenly loaded from side to side without creating any handling problems in the vehicle. With the down sizing of most domestic cars and trucks, the utility rack of the present invention provides a means to maintain the cleanliness of the interiors of such expensive vehicles. In contrast to the use of small trailers, the utility rack has no tires to go flat, no wheel bearings to seize, or any of the handling problems associated with pulling a utility trailer. A fiberglass storage box may be utilized in conjunction with the rack of the present invention which could be lockable, waterproof and secured to the utility rack.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A utility rack for attachment to a vehicle having a type trailer hitch including a rectangular socket, comprising:

a mounting bar having a square transverse cross sectional shape and having a straight portion terminating in a free end dimensioned for insertion into a rectangular trailer hitch socket, said free end having a transverse aperture for reception of a trailer hitch retaining pin;

said mounting bar having an upwardly inclined portion connected to said straight portion and said inclined portion having an end terminating at an elevation substantially above said free end;

a vertical support column secured on an upper surface of said straight mounting bar portion and extending to an elevation about equal with said mounting bar inclined portion end;

a V-shaped support strut having an apex secured on an upper surface of said inclined mounting bar portion, between said vertical support column and said inclined portion end;

said V-shaped strut having spaced free ends terminating at an elevation equal to said vertical support column and said mounting bar inclined portion end;

a horizontal rectangular platform supported substantially above said free end by said V-shaped strut, said vertical support column and said mounting bar inclined portion end;

said platform having a horizontal surface formed by steel mesh;

a pair of steel reinforced tail light guards on a rear portion of said platform; and a pair of tail lights mounted on said platform, within said guards.

* * * * *